United States Patent [19]
Kulpinski et al.

[11] Patent Number: 4,987,304
[45] Date of Patent: Jan. 22, 1991

[54] TELECENTRIC SCANNING FOR TRANSPARENT STORAGE PHOSPHORS

[75] Inventors: Robert W. Kulpinski, Rochester; Anthony R. Lubinsky, Webster, both of N.Y.

[73] Assignee: Eastman Kodak Company, Rochester, N.Y.

[21] Appl. No.: 414,819

[22] Filed: Sep. 29, 1989

[51] Int. Cl.$^5$ ............................................. G01N 23/04
[52] U.S. Cl. ................................................. 250/327.2
[58] Field of Search ........................... 250/327.2, 484.1

[56] References Cited

U.S. PATENT DOCUMENTS 4,816,679  3/1989  Sunagawa et al. ........... 250/484.1 B

FOREIGN PATENT DOCUMENTS 93425  5/1985  Japan ........................... 250/327.2 E Primary Examiner—Carolyn E. Fields
Attorney, Agent, or Firm—Warren W. Kurz

[57] ABSTRACT

Apparatus for scanning a transparent storage phosphor including, a source of stimulating radiation, scanning apparatus, apparatus for supporting the transparent phosphor and apparatus for optically directing the scanning radiation from the scanning apparatus so that it always strikes the phosphor perpendicular to the surface of the phosphor. Preferably, the apparatus for directing the scanning radiation is a telecentric lens system located between the scanning apparatus and the phosphor.

3 Claims, 2 Drawing Sheets

TELECENTRIC SCANNING FOR TRANSPARENT STORAGE PHOSPHORS

BACKGROUND OF THE INVENTION

U.S. Pat. No. 3,859,529 (Re. No. 31,847) to G.W. Luckey discloses the uses of stimulable phosphors as a recording medium in radiography. The recording medium is first exposed to x-rays of wavelengh $\lambda_1$ to form a latent image in the phosphor. The incoming flux of x-rays produces a number of excited electrons and holes in the phosphor, some of which are trapped in long-lived (storage) states within the phosphor. At a later time the phosphor may be destructively scanned by stimulating radiation of wavelength $\lambda_2$ to produce a luminescent emission of wavelength $\lambda_3$, which is proportional to the original x-ray exposure. The term "destructively" is used herein to denote that the phosphor is discharged by the stimulating radiation, and that only a finite amount of stimulated radiation is emitted by the phosphor, regardless of the quantity of stimulating radiation applied. The terms "storage phosphor(s)" and "phosphor(s)" as used herein, refer to phosphors that, upon stimulation, destructively release emitted radiation.

The above described system uses conventional x-ray exposure equipment. However, in place of the screen and film of conventional radiography a recording medium in the form of photo-stimulable luminescent storage phosphor is used to detect and record the image. After exposure the recording medium is scanned, in a raster pattern by a laser beam deflected by an oscillating or rotating scanning mirror, and the luminescent emission at wavelength $\lambda_3$ is collected and detected by a photodetector such as a photomultiplier tube and converted to digital information which is transmitted to a computer which, in turn, processes the image. U.S. Pat. No. 4,778,995 to R.W. Kulpinski et. al. discloses in schematic form the basic method of scanning, in which the laser is fixed, the laser beam is deflected in the fast or line scan direction (in this case by a rotating polygon mirror) and the recording medium advanced in the slow or page scan direction by a suitable sheet drive mechanism.

Optically turbid (non transparent) phosphor storage mediums are used in commercial systems currently available. However, there are certain advantages that an optically transparent phosphor has over a turbid phosphor. Since the MTF (Modulation Transfer Function; a measure of the ability of the system to record details) of the transparent phosphor imaging system is limited mainly by the effective size of the scanning beam of stimulating radiation, which may be adjusted to a desired size, the MTF may be made much higher than in a comparable turbid phosphor system. In addition, the x-ray absorption of the sheet may be increased by making it thicker, without increasing the effective size of the scanning beam. In this way the signal-to-noise ratio of the x-ray detector may be improved. In the conventional turbid storage phosphor sheets, the thickness is limited by the spreading of the scanning beam in the turbid phosphor. Optically transparent storage phosphors are disclosed in U.S. Pat. No. 4,733,090 to C.D. DeBoer et. al.

In the practice of scanning a transparent storage phosphor, however, a new problem may arise as a result of the lack of stimulating radiation scattering in the phosphor. That is, if the index of refraction $n_2$ (at wavelength $\lambda_2$) of the medium following the transparent phosphor in the optical path is not exactly matched to the index $n_1$ of the phosphor (at $\lambda_2$), then some fraction of the stimulating beam 3 will be reflected back into the storage phosphor 5 at the $n_1 - n_2$ boundary, as indicated by 7 in FIG. 1. Beam 3 is generated by a laser (not shown), deflected by a conventional rotating mirror 8 and passes through a conventional f0 lens 9, which converts the constant angular velocity of beam 3 into a spot at the image plane that moves at constant linear velocity. Further, if the stimulating beam 3 is not directed perpendicularly to the storage medium but rather is incident at some finite angle to the normal, as is typical in raster scanning systems such as illustrated in U.S. Pat. No. 4,778,995 to R.W. Kulpinski et. al., then the reflected portion of the beam will be directed away from the area of the incident beam, as indicated in FIG. 1. The unwanted reflected light may continue on this path for some distance within the storage phosphor 5, giving rise to undesirable effects similar to those of "flare light" in many other optical systems. These effects include a degradation in image contrast, "shadow" artifacts, and a loss in output signal-to-noise ratio, particularly when scanning a low x-ray exposure region surrounded by regions of higher exposure. Further, since the storage phosphor is scanned destructively, the undesirable effects of flare light are actually enhanced compared to the case of non-destructive scanning, when the scanning is carried out at high laser power.

The object of the present invention is to solve the above described problem.

SUMMARY OF THE INVENTION

In apparatus for scanning a transparent phosphor including, a source of stimulating radiation, apparatus for scanning the phosphor and apparatus for supporting the phosphor, apparatus for optically directing the scanning radiation incident from the scanning apparatus so that such scanning radiation is everywhere perpendicular to the surface of said phosphor. Preferably, the apparatus for directing the scanning radiation is a telecentric lens system located between the scanning apparatus and the phosphor. The lens system may be refractive or reflective. Also, preferably the surface of the phosphor remote from the telecentric lens system is coated with a dichroic layer which reflects the stimulating radiation but not the radiation emitted by the phosphor.

DESCRIPTION OF THE PREFERRED EMBODIMENT

Figure 2:
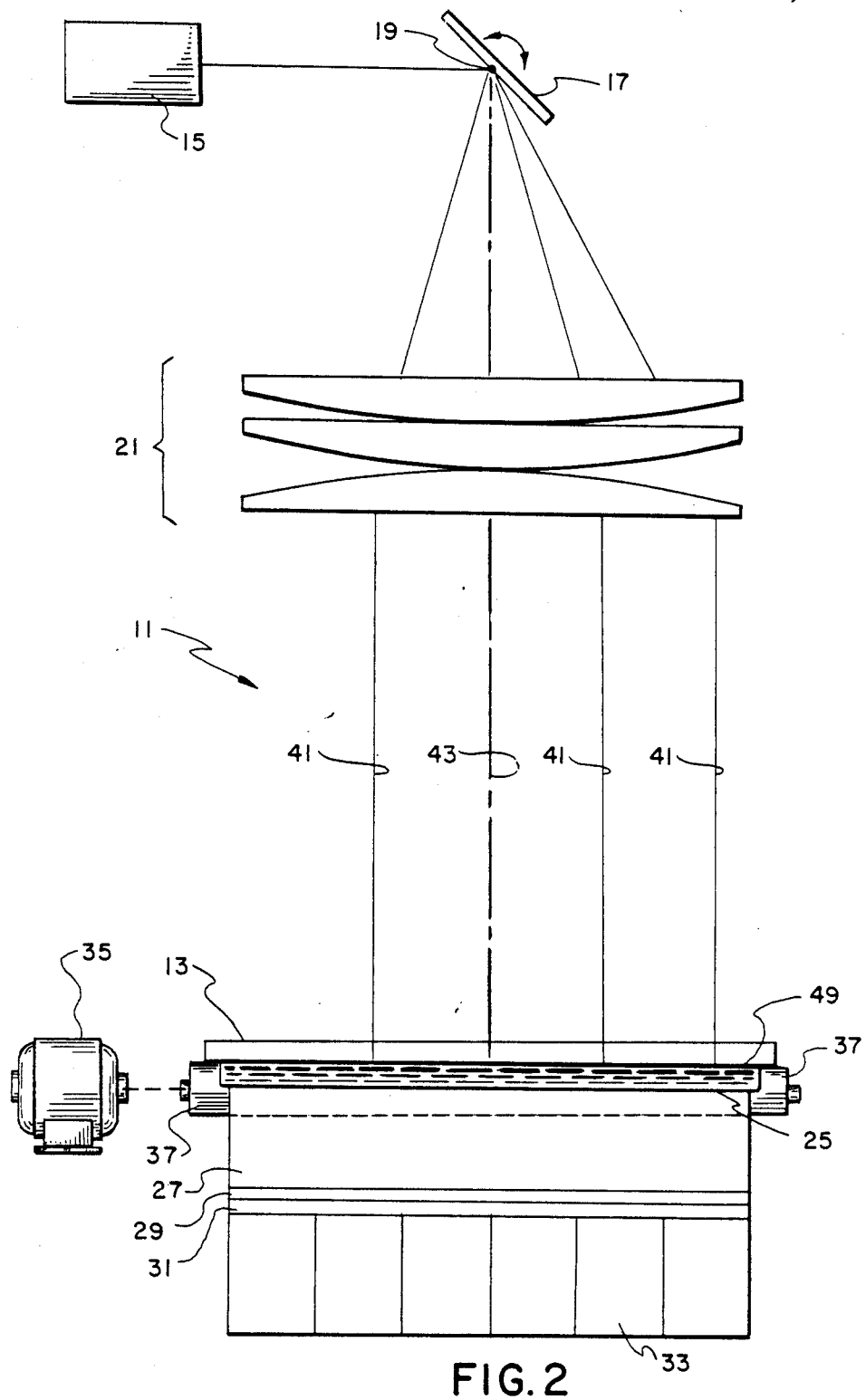
FIG. 2 is a schematic of the preferred embodiment of the present invention.

With reference to FIG. 2, the solution to the above described problem is to replace the typical f0 scanning optics with a system including a telecentric lens system. Scanning system 11, for scanning transparent phosphor 13, includes a source of scanning radiation 15, a rotating mirror 17 having a pivot point 19 for scanning phosphor 13, a telecentric lens system 21, an optical coupling liquid 25, a light bar 27, filters 29 and 31 and a photomultiplier tube array 33. A conventional sheet drive mechanism, including motor 35 and drive roller 37 is used for moving phosphor 13 in the page direction, also known as the slow scan or y direction.

Transparent phosphor 13 comprises a photostimulable phosphor material dispersed in a polymeric binder. The polymeric binder is selected such that its index of refraction matches that of the phosphor at the stimulating wavelength $\lambda_2$, but does not necessarily match that of the phosphor at the emitted wavelength $\lambda_3$. See U.S. Pat. No. 4,733,090 to C. D. DeBoer et. al. Alternately, the phosphor recording medium could be made by another process, such as described in Laser-Stimulable Transparent CsI:Na Film for High Quality X-Ray Imaging Sensor, by Tsuyoshi Kano et. al., Applied Physics Letters, Apr. 28, 1986.

Source 15 is a laser which produces the scanning or stimulating beam of radiation of wavelength $\lambda_2$. As those skilled in the art will appreciate, mirror 17 is mounted, by any conventional means (not shown), for rotation about axis 19 to enable the direction of the beam to be varied to permit scanning in the line direction, also referred to as the fast scan or x direction.

Telecentric lens 21 is designed such that one of its focal points is at or near the pivot point 19 and the exiting principle rays, as indicated by 41, are parallel to optical axis 43 of system 11. Lens 21 is telecentric in the image space, and the scanning beam is everywhere perpendicular to phosphor 13. As those skilled in the art will also appreciate, the diameter of lens system 21 must be slightly greater than the diameter of phosphor in the fast scan direction. Also, lens 21 could be replaced with a reflective telecentric system.

As is also evident from FIG. 2, system 11 also includes apparatus to effectively transfer the stimulated radiation $\lambda_3$ from phosphor 13 to PMT array 35. As is more fully described in U.S. Pat. No. 4,778,995 to R. W. Kulpinski et. al., this may be accomplished by optical coupling 25 and light bar 27. Optical coupling liquid 25 is a layer of fluid having an index of refraction the same as light bar 27 and phosphor 13, all at the luminescent emission of wavelength $\lambda_3$. Filters 29 and 31 function to absorb stimulating wavelength $\lambda_2$ while passing the stimulated wavelength $\lambda_3$ through to PMTs 33.

Figure 1:
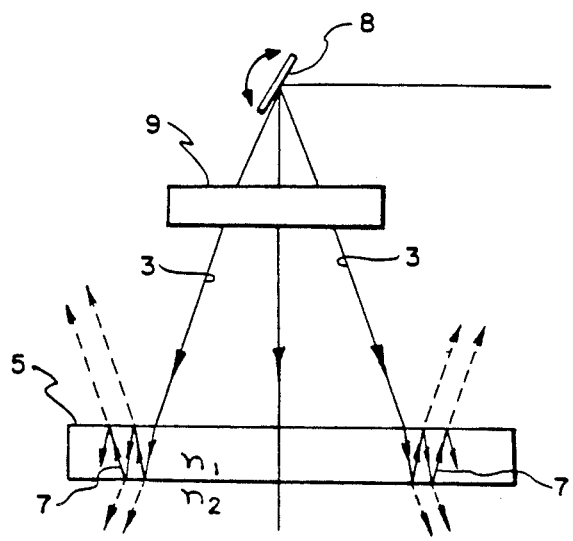
FIG. 1 is a schematic illustrating the relationship between the scanning optics of the prior art and the transparent storage phosphor, and the resultant flare light.
Figure 3:
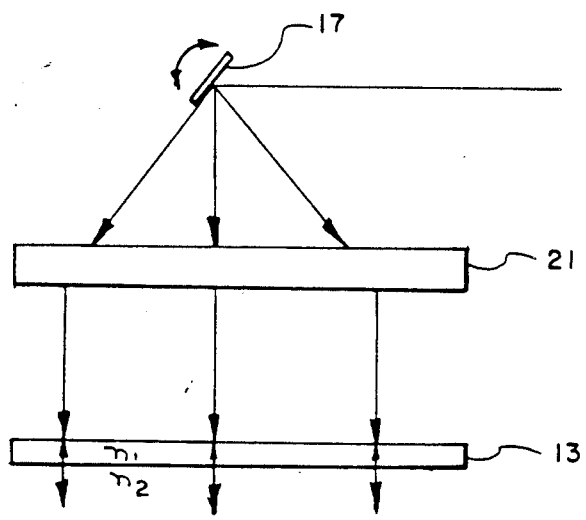
FIG. 3 is a schematic illustrating the optical relationship between the scanning optics, a telecentric lens system, and the transparent storage phosphor.

With reference to FIG. 3, it can be seen that telecentric lens system 21 solves the problem of internal reflections of the scanning beam and the problem of internal flare light described above, since the stimulating radiation $\lambda_2$ reflected at the $n_1-n_2$ boundary, where $n_1 \neq n_2$ at wavelength $\lambda_2$, is directed back along the original path of the stimulating rays.

The amount of stimulating exposure required to read out the signal stored in a transparent storage screen in the form of trapped electrons is very large. This is because the trapping electronic states are typically F-centers, and the optical cross-section for F-center absorption is very small. Thus, a large laser is typically required as a source of stimulating radiation. Thus, it is very desirable for the stimulating light beam to make 2 or more passes through the transparent phosphor 13, provided that the stimulating energy remains within the pixel currently being read. This is what occurs in the above described system if, at wavelength $\lambda_2$, the index of refraction $n_2$ of the material following transparent phosphor 13 in the optical path differs from that of the phosphor screen $n_1$.

In addition, a dichroic layer 49 may be placed at the back of transparent phospher screen 13, as shown in FIG. 2, which reflects the stimulating wavelength $\lambda_2$ and which transmits the emitted wavelength $\lambda_3$. The arrangement shown in FIGS. 2 and 3 is optimal for both maximizing the collected light $\lambda_3$, and minimizing the required source intensity at $\lambda_2$. Thus, telecentric lens 21 could be used in conjunction with the apparatus illustrated in FIGS. 7 and 8 of U.S. Pat. No. 4,778,995 to R. W. Kulpinski et. al.

The above described system is especially useful for scanning transparent phosphors in situations where MTF effects due to the obliqueness of the original exposing rays at $\lambda_1$ are unimportant, for example: very low-energy x-ray imaging; cases where the x-ray source to storage phosphor distance may be made very large; and cases where the storage phosphor may not be exposed by x-rays, but rather by light, e.g. uv light.

Thus, the above described apparatus has the following advantages: it eliminates the harmful effects of internal reflections and internal flare; can lower the required intensity of the stimulating source and thus reduce the cost or, alternately, increase the scanning speed without increasing the laser power requirements or cost; it is useful for low energy applications; long source to phosphor applications; non x-ray exposures; and it is useful for testing transparent storage phosphors for resolution.

Whereas the drawings and accompanying description have shown and described the preferred embodiments of the present invention, it will be apparent to those skilled in the art that various changes may be made in the form of the invention without effecting the scope thereof.

We claim:

1. Apparatus for scanning a transparent phosphor, said apparatus including a source of stimulating radiation, scanning means, means for supporting said phosphor and a telecentric lens system for directing the stimulating radiation from said source so that it is everywhere perpendicular to the surface of said phosphor.

2. The apparatus as set forth in claim 1, wherein said telecentric lens system has a focal point at or near the axis of rotation of said scanning means and an object formed at infinity, whereby said stimulating radiation always strikes said phosphor surface perpendicularly.

3. The apparatus as set forth in claim 2, wherein the surface of said phosphor remote from said telecentric lens system has a dichroic coating which reflects said stimulating radiation but passes radiation emitted by said phosphor.

* * * * *